(12) United States Patent
Khurana et al.

(10) Patent No.: US 12,063,259 B2
(45) Date of Patent: Aug. 13, 2024

(54) SYSTEM FOR DOCUMENT COMMENTING DURING VIRTUAL MEETINGS

(71) Applicant: Microsoft Technology Licensing, LLC, Redmond, WA (US)

(72) Inventors: Gaurav Khurana, Delhi (IN); Nitin Nizhawan, Delhi (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 19 days.

(21) Appl. No.: 17/844,620

(22) Filed: Jun. 20, 2022

(65) Prior Publication Data

US 2023/0412653 A1 Dec. 21, 2023

(51) Int. Cl.
*H04L 65/401* (2022.01)

(52) U.S. Cl.
CPC ................................ *H04L 65/4015* (2013.01)

(58) Field of Classification Search
CPC .................................................... H04L 65/4015
See application file for complete search history.

(56) References Cited

U.S. PATENT DOCUMENTS

| | | | |
|---|---|---|---|
| 6,463,460 B1 | 10/2002 | Simonoff | |
| 10,484,189 B2 | 11/2019 | Albrecht | |
| 10,708,208 B2 | 7/2020 | Wilde et al. | |
| 10,880,098 B2 | 12/2020 | Lee et al. | |
| 11,106,862 B2 | 8/2021 | Curry et al. | |
| 2006/0235927 A1 | 10/2006 | Bhakta et al. | |
| 2013/0097481 A1* | 4/2013 | Kotler | G06F 16/34 715/230 |
| 2013/0124967 A1* | 5/2013 | Hatfield | G06T 11/60 715/233 |
| 2018/0121214 A1 | 5/2018 | Faulkner et al. | |
| 2019/0034395 A1* | 1/2019 | Curry | G06F 40/166 |

(Continued)

FOREIGN PATENT DOCUMENTS

WO 2020190520 A1 9/2020

OTHER PUBLICATIONS

"Word.Comment Class", Retrieved from: https://web.archive.org/web/20211213103830/https:/docs.microsoft.com/en-us/javascript/api/word/word.comment?view=word-js-preview, Dec. 13, 2021, 10 Pages.

(Continued)

*Primary Examiner* — Lesa M Kennedy
(74) *Attorney, Agent, or Firm* — Schwegman Lundberg & Woessner, P.A.

(57) ABSTRACT

Systems and methods are directed to synchronizing comments between a document and a virtual meeting. The document is shared in a screen-share section of a meeting user interface. A comment widget monitors for comments made to the document. In response to detecting a first comment made to the document, the comment widget synchronizes the first comment with a chat section of the meeting user interface. The comment widget also monitors for comments made in the chat section of the meeting user interface and detects that a second comment made in the chat section is linked to the first comment. In response, the comment widget synchronizes the second comment to the document by positioning a copy of the second comment relative to the first portion of the document and the first comment in the same context. The first and second comment create a first comment thread in the chat section.

20 Claims, 10 Drawing Sheets

(56) References Cited

U.S. PATENT DOCUMENTS

| | | | |
|---|---|---|---|
| 2019/0149501 A1* | 5/2019 | Bastide | G06Q 50/01 |
| | | | 709/206 |
| 2020/0050641 A1 | 2/2020 | Devincenzi et al. | |
| 2020/0293261 A1* | 9/2020 | Janamanchi | H04L 12/1831 |
| 2021/0352120 A1 | 11/2021 | Masi et al. | |
| 2021/0409416 A1* | 12/2021 | Reyna Fernandez | H04L 51/18 |
| 2022/0164408 A1 | 5/2022 | Petty et al. | |

OTHER PUBLICATIONS

Golia, Jeff, "Exploring Video Collaboration to Improve Virtual Teams: A Case Study in North Carolina", In Thesis of Colorado Technical University, Jun. 2020, 24 Pages.

"International Search Report and Written Opinion Issued in PCT Application No. PCT/US2023/019694", Mailed Date: Jun. 28, 2023, 17 Pages.

\* cited by examiner

SYSTEM FOR DOCUMENT COMMENTING DURING VIRTUAL MEETINGS

TECHNICAL FIELD

The subject matter disclosed herein generally relates to virtual meetings. Specifically, the present disclosure addresses systems and methods that provide enhanced commenting in shared documents during the virtual meeting.

BACKGROUND

In a collaborative virtual meeting, users may share a document and have discussions about the document. Typically, comments are made in the document, which occurs outside of the virtual meeting. Conventionally, if two participants are reviewing and commenting on the document at different locations (e.g., User A is commenting on page 1 and User B is commenting on page 6), neither participant will receive a notification of the other user's comment. Other participants who are just viewing the virtual meeting may also not receive any notification about either comment. Additionally, communication may occur in multiple locations or panes (e.g., a comments pane of the document in a word processing application, video stream where a presenter is presenting the document, meeting chat where participants are discussing the document with the presenter and others). Furthermore, if a presenter wants to respond to any comments during the virtual meeting, the presenter may need to navigate to the comment pane and click on the comment. The navigating and clicking on the comment takes the presenter to the comment, but loses context in the virtual meeting (i.e., what the presenter was presenting before clicking on the comment). Moreover, this may disturb the flow of the virtual meeting and the audience. Thus, commenting in conventional systems can lead to a poor virtual meeting experience.

BRIEF DESCRIPTION OF THE DRAWINGS

Some embodiments are illustrated by way of example and not limitation in the figures of the accompanying drawings.

DETAILED DESCRIPTION

Figure 1:
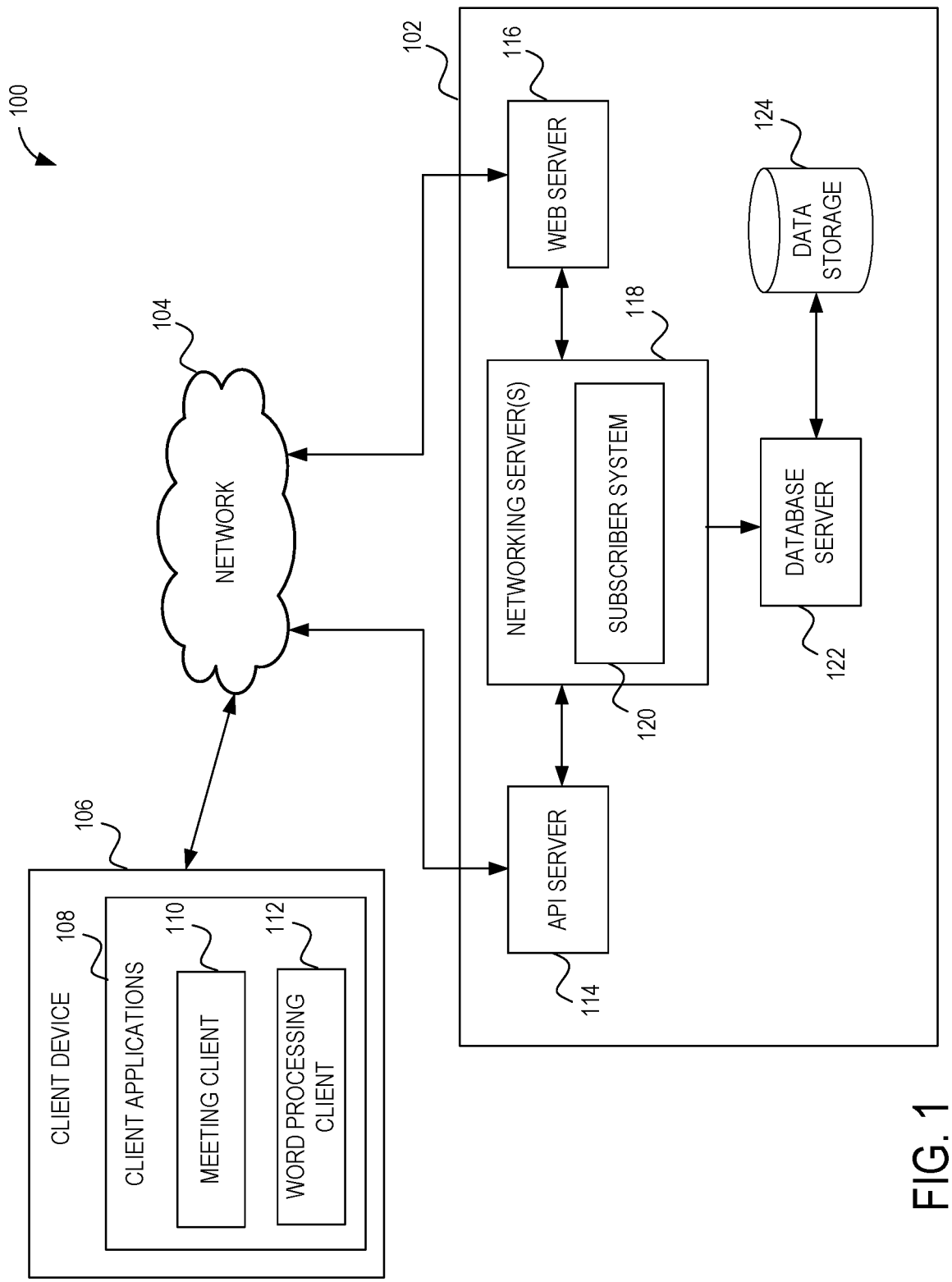
FIG. 1 is a diagram illustrating a network environment suitable for enhanced commenting in documents during a virtual meeting, according to some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example embodiments provide a system for enhanced commenting in documents during a virtual meeting. Conventionally, if users join a virtual meeting and want to review a document, the users can view the document that is shared on a screen or separately view the document in a word processing application on their desktop and provide comments in a chat section of the meeting user interface. Example embodiments connect these two applications (e.g., meeting application and word processing application) to allow comments made to the document to flow between them.

An exemplary meeting system provides two mechanisms for communication during a virtual meeting. The first mechanism is a video component where a presenter shares content via screen-sharing. The second mechanism is a meeting chat where chats (also referred to as "messages" or "chat messages") and collaboration related to the meeting can occur. Example embodiments integrate these two mechanisms to provide an enhanced commenting tool that will provide a better meeting experience for participants.

Specifically, a chat section of a meeting user interface allows meeting participants to view and respond to comments made to a document that is being shared in a screen-share section of the meeting user interface. New and old comments created in the shared document (e.g., in a word processing application) will appear in the chat section as messages. Participants can reply to those messages in the chat section and these replies will be added as comments, in context, in the document (e.g., in the word processing application and in the screen-share section) even if the corresponding portion of the document is not currently visible in the screen-sharing section. Thus, participants can response to comments in the document directly from within the meeting channel (e.g., chat section). Furthermore, a presenter can respond to the comments directly from the chat section and does not have to scroll through the document to find the comment to respond to while presenting.

As a result, example embodiments provide a technical solution for synchronizing comments between a document displayed in a screen-sharing section and a chat section of the meeting user interface. The technical solution uses a comment widget that is added to every meeting channel that is created by default for every virtual meeting. When a presenter shares the document in the virtual meeting, the comment widget attaches to the document and monitors for comments. Any comments in the document will be synchronized to the meeting channel via the comment widget. Meeting participants can respond to the comment via the comment widget from within the meeting channel and these replies will be synchronized back on the document in the same context with a same username who posted the reply. When the document is unshared or the virtual meeting ends, the comment widget will detach itself from the document and no longer monitor for or synchronize the comments.

As a result, one or more of the methodologies described herein facilitate solving the technical problem of synchronizing comments in a document during a virtual meeting. In particular, participants can respond to comments in the document directly from within the meeting channel (e.g., via a chat section) and do not need to switch applications (e.g., from a meeting application to a word processing application) to view comments or replies. Additionally, a presenter can respond to comments in the chat section while presenting and does not have to interrupt a presentation to address the comments.

FIG. 1 is a diagram illustrating a network environment 100 suitable for enhanced commenting in documents during a virtual meeting, according to some example embodiments. A network system 102 provides server-side functionality, via a communication network 104 to a plurality of client devices including client device 106. The network system 102 is configured to synchronize comments made to a document (e.g., in a word processing application) being shared during a virtual meeting and comments made in a chat section of a meeting user interface with each other. Specifically, if a user inputs a comment into the document, that comment flows into a meeting channel and any responses on that meeting channel can flow back to the document.

In example embodiments, the client device 106 is a device of a user of the network system 102. In some instances, the client device 106 is a device of a presenter that is presenting or hosting a virtual meeting in which one or more documents are shared and commented on. In some instances, the client device 106 is a device of a user attending the virtual meeting. The client device 106 includes client applications 108 that generate and view documents and allow a user to attend a virtual meeting. For example, the client applications 108 can include a meeting client 110 and a word processing client 112. The meeting client 110 is used by the client device 106 to attend the virtual meeting. Specifically, the meeting client 110 communicates with the network system 102 to exchange data in order to participate in the virtual meeting.

The word processing client 112 manages generating, viewing, and editing of word documents. In various embodiments, one or more of the documents managed by the word processing client 112 may be shared during the virtual meeting. While example embodiments discuss sharing and commenting on word documents during the virtual meeting, it is contemplated that any type of document that allows for commenting can be shared in example embodiments. For example, the document can be a slide presentation, a spreadsheet, or a drawing (e.g., visual diagram, graphics). In these cases, a corresponding client (e.g., presentation client, spreadsheet client, drawing client) may also be included in the client applications 108.

The client device 106 interfaces with the network system 102 via a connection with the network 104. Depending on the form of the client devices 106, any of a variety of types of connections and networks 104 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks, 5G networks). When such technology is employed, the network 104 includes a cellular network that has a plurality of cell sites of overlapping geographic coverage, interconnected by cellular telephone exchanges. These cellular telephone exchanges are coupled to a network backbone (e.g., the public switched telephone network (PSTN), a packet-switched data network, or other types of networks).

In another example, the connection to the network 104 is a Wireless Fidelity (Wi-Fi, IEEE 802.11x type) connection, a Worldwide Interoperability for Microwave Access (WiMAX) connection, or another type of wireless data connection. In some embodiments, the network 104 includes one or more wireless access points coupled to a local area network (LAN), a wide area network (WAN), the Internet, or another packet-switched data network. In yet another example, the connection to the network 104 is a wired connection (e.g., an Ethernet link) and the network 104 is a LAN, a WAN, the Internet, or another packet-switched data network. Accordingly, a variety of different configurations are expressly contemplated.

The client device 106 may comprise, but is not limited to, a smartphone, tablet, laptop, multi-processor systems, microprocessor-based or programmable consumer electronics, game consoles, set-top boxes, a server, or any other communication device that can access the network system 102. In some embodiments, the client device 106 comprises a display module (not shown) to display information (e.g., in the form of user interfaces).

Turning specifically to the network system 102, an application programing interface (API) server 114 and a web server 116 are coupled to, and provide programmatic and web interfaces respectively to, one or more networking servers 118 (or application servers). The networking server(s) 118 host a subscription system 120, which comprises a plurality of components, and which can be embodied as hardware, software, firmware, or any combination thereof. The subscriber system 108 can comprise a cloud-based software-as-a-service (SaaS) system that provides a plurality of applications that generate, edit, and display documents that can be shared during a virtual meeting. The subscription system 120 will be discussed in more detail in connection with FIG. 2.

The networking servers 118 are, in turn, coupled to one or more database servers 122 that facilitate access to one or more information storage repositories or data storage 124. In some embodiments, the data storage 124 is a storage device storing user accounts and documents generated by the users of the network system 102.

In example embodiments, any of the systems, devices, or services (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system, device, or machine. For example, a special-purpose computer system able to implement any one or more of the methodologies described herein is discussed below with respect to FIG. 6, and such a special-purpose computer is a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any of the components illustrated in FIG. 1 or their functions may be combined, or the functions described herein for any single component may be subdivided among multiple components. Additionally, any number of client devices 106 may be embodied within the network environment 100. While only a single network system 102 is shown, alternative embodiments contemplate having more than one network system 102 to perform the operations discussed herein (e.g., each localized to a particular region).

Figure 2:
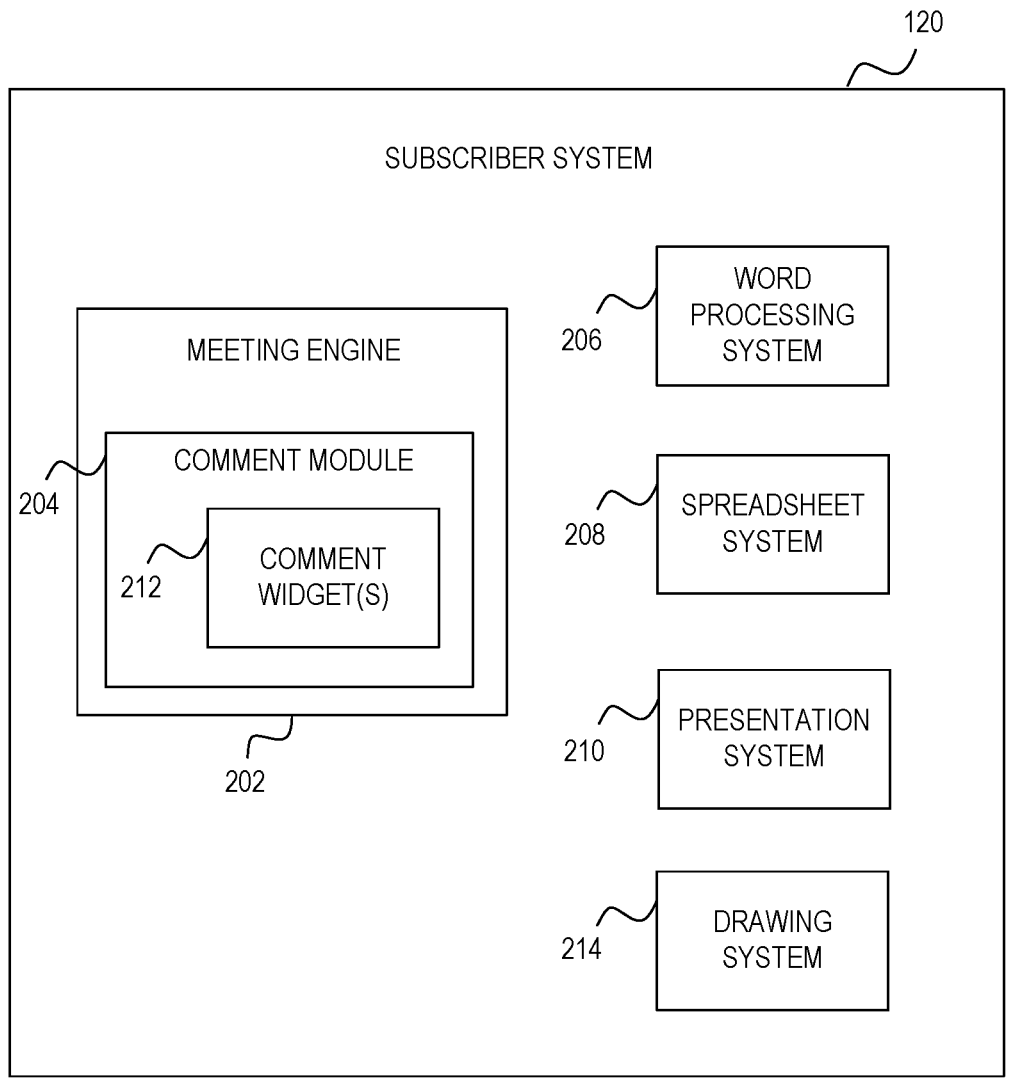
FIG. 2 is a diagram illustrating components of a network system used in providing enhanced commenting during the virtual meeting, according to some example embodiments.

FIG. 2 is a diagram illustrating components of the network system 106, and more particularly, the subscriber system 120, used in providing enhanced commenting during the virtual meeting, according to some example embodiments. The subscriber system 120 can comprise a cloud-based software-as-a-service (SaaS) system that provides a plurality of applications that generate, edit, and display documents that can be shared during a virtual meeting and that conduct the virtual meeting. In various embodiments, the subscriber system 120 provides a cloud version of one or more of the client applications 108 at the client device 106 and/or can interact with the corresponding client application 108 at the client device 106. The subscriber system 108 can comprise a meeting engine 202 with a comment module 204, a word processing system 206, a spreadsheet system 208, a presentation system 210, and a drawing system 214 all configured to communicate with each other (e.g., via a bus, shared memory, or a switch). Alternative embodiments may comprise more or less components, combine the functions of some of these components into a single component, or make some components optional.

In example embodiments, the meeting engine 202 comprises one or more servers or applications configured to establish and maintain a virtual meeting between two or more client devices via the network 104. For example, the meeting engine 202 can be Microsoft Teams. The meeting engine 202 can electronically couple users at their respective client devices in the virtual meeting whereby at least one user is a presenter or host, and the other user(s) are attendees or participants.

In example embodiments, the comment module 204 associates a comment widget 212 (from one or more comment widgets) with each virtual meeting, for example, upon establishing the virtual meeting. The comment widget 212 is configured to monitor for and manage synchronizing comments during the sharing of a document. While the comment module 204 is shown as a part of the meeting engine 202, alternatively, the comment module 204 can be located elsewhere and be communicatively coupled with the meeting engine 204.

During the virtual meeting, one of the users (e.g., the presenter or an attendee) triggers sharing of a document. For example, the presenter can open a word document on their client device 106 using the word processing client 112 and share their screen. In response, a screen-share section of a virtual meeting user interface will show the screen of the presenter, and more importantly, the document being shared. In example embodiments, the comment widget 212 automatically attaches to the document once it is being shared and monitors for comments made to the document. If the comment widget 212 detects a first comment made to a portion of the document, the comment widget 212 synchronizes the first comment with a meeting channel. Specifically, a copy of the first comment is posted to a chat section of the meeting user interface by the comment widget 212. In example embodiments, the comment widget 212 uses a comments application programming interface (API) to automatically post a copy of the comment to the chat section. If a second comment is input in the chat section that is linked to the first comment (e.g., a reply to the first comment), the commenting widget 212 synchronizes the second comment to the document by positioning a copy of the second comment relative to the first comment in the same context in the document. Additionally or alternatively, a further comment/reply made to the portion of the document is also synchronized by the comment widget 212 by posting a copy of the further comment/reply to the chat section of the meeting user interface at a correct location with context. Thus, there can be multiple comments provided in the document and/or the chat section linked to a same portion of the document that are synchronized (in both directions). In example embodiments, each comment is associated with a user that posted the comment and includes a user identifier of the respective user (e.g., a username and/or image of the user).

The chat section can be used to track, display, and reply to comments made to the document during the virtual meeting. For example, the first comment and the second comment (e.g., the reply to the first comment) and/or the further comment/reply create a comment thread or feed in the chat section. There can be a plurality of comment threads in the chat section that are distinguished from each other (e.g., by a title for the comment thread that is related to a portion of the document that the comment pertains to). The chat section can also include chat messages that are not comments to the document. These chat messages are also distinguished from the comment threads.

The word processing system 206 comprises one or more servers or applications configured to generate and edit text documents. For example, the word processing system 206 can be Microsoft Word. In some cases, the word processing system 206 can work with the word processing client 112 at the client device 106 to generate and edit the text document.

The spreadsheet system 208 comprises one or more servers or applications configured to generate and edit spreadsheet documents. For example, the spreadsheet system 208 can be Microsoft Excel. In some cases, the spreadsheet system 208 can work with a corresponding client (e.g., a spreadsheet client) at the client device 106 to generate and edit the spreadsheet document.

The presentation system 210 comprises one or more servers or applications configured to generate and edit presentations including presentation slides. For example, the presentation system 210 can be Microsoft PowerPoint. In some cases, the presentation system 210 can work with a corresponding client (e.g., a presentation client) at the client device 106 to generate and edit the presentation slides.

The drawing system 214 comprises one or more servers or applications configured to generate and edit visual diagrams and graphics. For example, the drawing system 214 can be Microsoft Visio. In some cases, the drawing system 214 can work with a corresponding client (e.g., a drawing client) at the client device 106 to generate and edit the visual diagrams and graphics.

Collectively, the word processing system 206, the spreadsheet system 208, the presentation system 210, and the drawing system 214 can generate and/or provide the documents that are shared during the virtual meeting. As such, the sharable documents can be a text document, a spreadsheet, a slide presentation, a drawing, or any other type of document that can be commented on. During the sharing of the document, the comment widget 212 or the respective application/system providing the document can periodically, automatically save the document with the comments. Once the document is no longer shared, the comment widget 212 detaches from the document and stops monitoring for comments.

Figure 3:
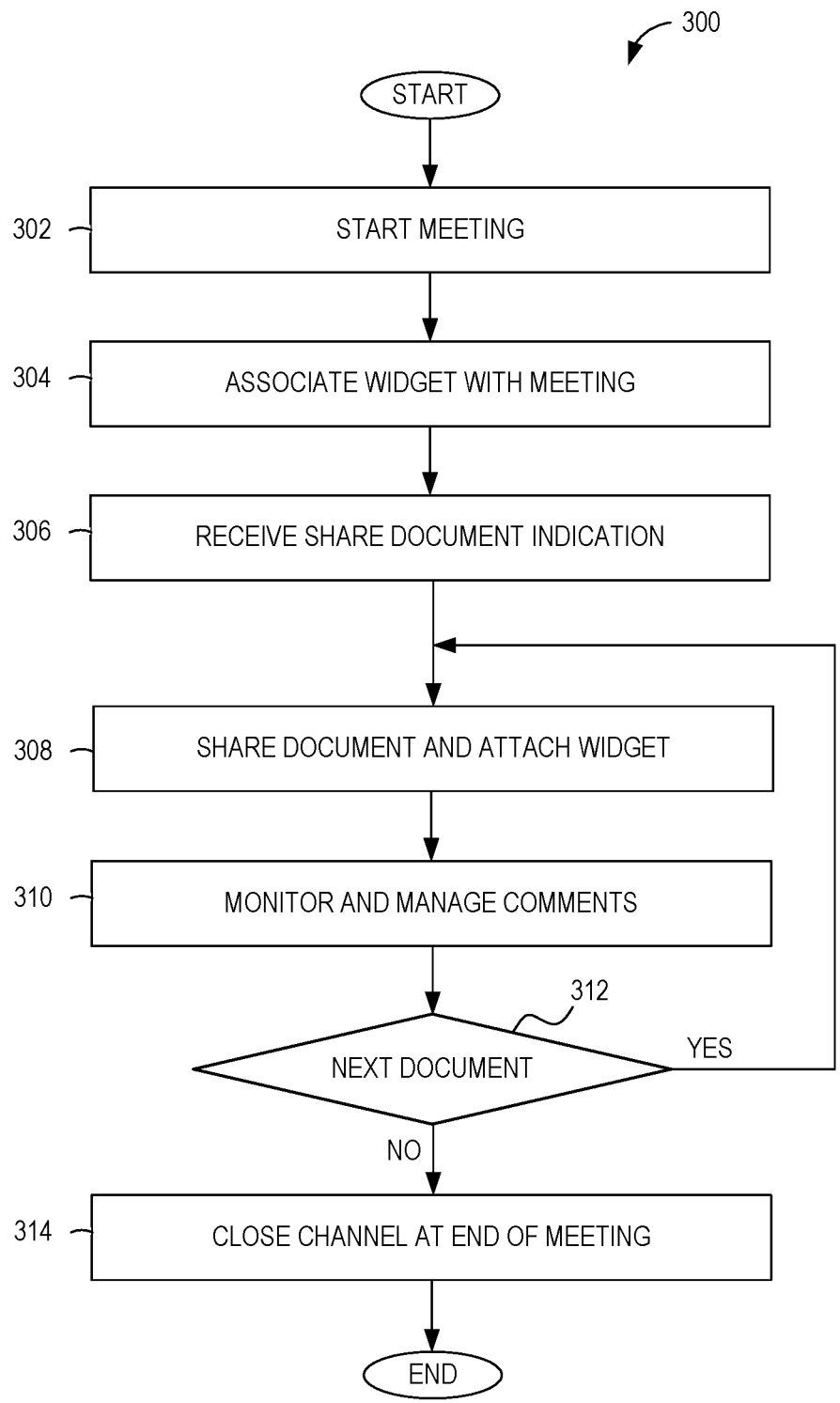
FIG. 3 is a flowchart illustrating operations of a method for providing enhanced commenting in documents during the virtual meeting, according to some example embodiments.

FIG. 3 is a flowchart illustrating operations of a method 300 for providing enhanced commenting in documents during the virtual meeting, according to some example embodiments. Operations in the method 300 may be performed by the network system 102 in the network environment 100 described above with respect to FIG. 1-FIG. 2. Accordingly, the method 300 is described by way of example with reference to these components in the network system 102. However, it shall be appreciated that at least some of the operations of the method 300 may be deployed on various other hardware configurations or be performed by similar components residing elsewhere in the network environment 100. Therefore, the method 300 is not intended to be limited to these components.

In operation 302, a virtual meeting is started. In example embodiments, a host or presenter activates the meeting client 110 at the client device 106 and/or triggers the meeting engine 202 at the subscriber system 120 to start the virtual meeting.

In operation 304, a comment widget is associated with the meeting. In example embodiments, the comment widget is provided by the comment module 204 and associated with each virtual meeting upon establishing the virtual meeting. The comment widget is configured to monitor for and manage synchronizing comments during the sharing of a document.

In operation 306, the meeting engine 202 receives an indication to share a document. During the virtual meeting, a user (e.g., a presenter, an attendee) can share a document. Accordingly, the user activates an application (e.g., client application 108, application of the word processing system 206, spreadsheet system 208, presentation system 210, drawing system 214, or another corresponding client at the client device 106) and opens the document that the user wants to share. The user then activates a share-screen option presented on a meeting user interface of the virtual meeting.

In operation 308, the document is shared, and the comment widget is attached to the document. A screen-share section of the meeting user interface will show the screen of the presenter, and more particularly, the document being shared. In example embodiments, the comment widget automatically attaches to the document once it is being shared and monitors for comments made to the document.

In operation 310, the comment widget monitors for comments and manages synchronization of comments that are related to the document. Operation 310 will be discussed in more detail in connection with FIG. 4.

In operation 312, a determination is made whether a next document is to be shared after a previous document is no longer shared. If a next document is to be shared, then the method 300 returns to operation 308 where the next document is shared, and the comment widget is attached to the next document.

However, if there is no further document to be shared, then the method 300 proceeds to operation 314. In operation 314, the corresponding meeting channel is closed at the end of the virtual meeting. When the meeting ends, the comment widget is no longer associated with the virtual meeting.

Figure 4:
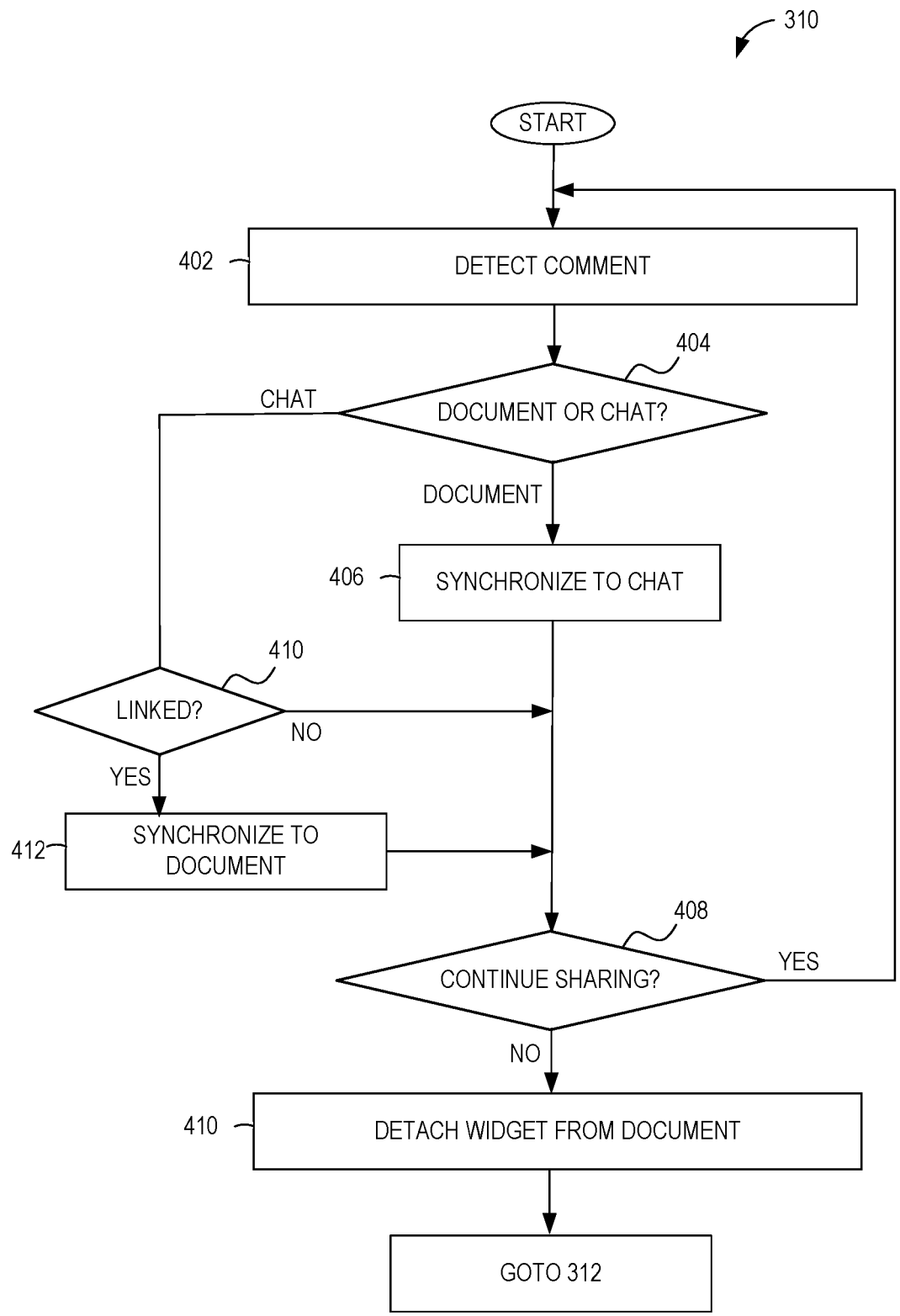
FIG. 4 is a flowchart illustrating operations of a method for monitoring and managing comments during the virtual meeting, according to some example embodiments.

FIG. 4 is a flowchart illustrating operations of a method for monitoring and managing comments during the virtual meeting (e.g., operation 310), according to some example embodiments. Operations in the method may be performed by the network system 102 in the network environment 100 described above with respect to FIG. 1-FIG. 2. Accordingly, the method is described by way of example with reference to these components in the network system 102. However, it shall be appreciated that at least some of the operations of the method may be deployed on various other hardware configurations or be performed by similar components residing elsewhere in the network environment 100. Therefore, the method of FIG. 4 is not intended to be limited to these components.

In operation 402, the comment widget detects a comment. The comment can be made to a portion of the document or the comment can be made in a chat section in the meeting user interface.

If the comment is detected in the document in operation 404, then the comment is synchronized with a meeting channel. Specifically, the comment is synchronized with a chat section of the meeting user interface by the comment widget in operation 406. For example, the comment widget can use a comments application programming interface (API) to automatically post a copy of the comment to the chat section. If the comment is not the first comment associated with a specific portion of the document (e.g., it is a reply to a previous comment in the document), the comment is copied to the chat section at a correct location (e.g., a comment thread corresponding to the specific portion) and with context (e.g., as a reply to the previous comment). After the comment is posted to the chat section, the method proceeds to operation 408.

However, if the comment is detected in the chat section in operation 404, a determination is made whether the comment is linked to an existing comment in the document in operation 410. In some cases, the comment in the chat section may be a chat message that is not linked to any document. In these cases, the comment is not synchronized, and the method proceeds to operation 408. For example, the comment can be a chat message that is not a reply to a comment from the document.

Alternatively, if the comment is linked to an existing comment in the document (e.g., a reply to the existing comment in a same comment thread), then the comment from the chat section is synchronized to the document in operation 412. In example embodiments, a copy of the comment is positioned relative to the existing comment in the document in a same context. In example embodiments, each comment is associated with a user that posted the comment and includes a user identifier of the respective user (e.g., a username and/or image of the user).

In operation 408, a determination is made whether the document is still being shared. If the document is still being shared, then the method returns to operation 402 where the comment widget continues to monitor for and detect a next comment. It is noted that there can be any number of comments made to the document, to a specific portion of the document, to the chat section, and to a comment thread and these comments can be synchronized between the document and the chat section to a correct location and with context.

However, if the document is no longer being shared, then the comment widget is detached from the document and the method continues to operation 312 of FIG. 3. In some embodiments, once the comment widget is detached from the document, comments (e.g., replies) can no longer be made to the document in the chat section.

Figure 5A:
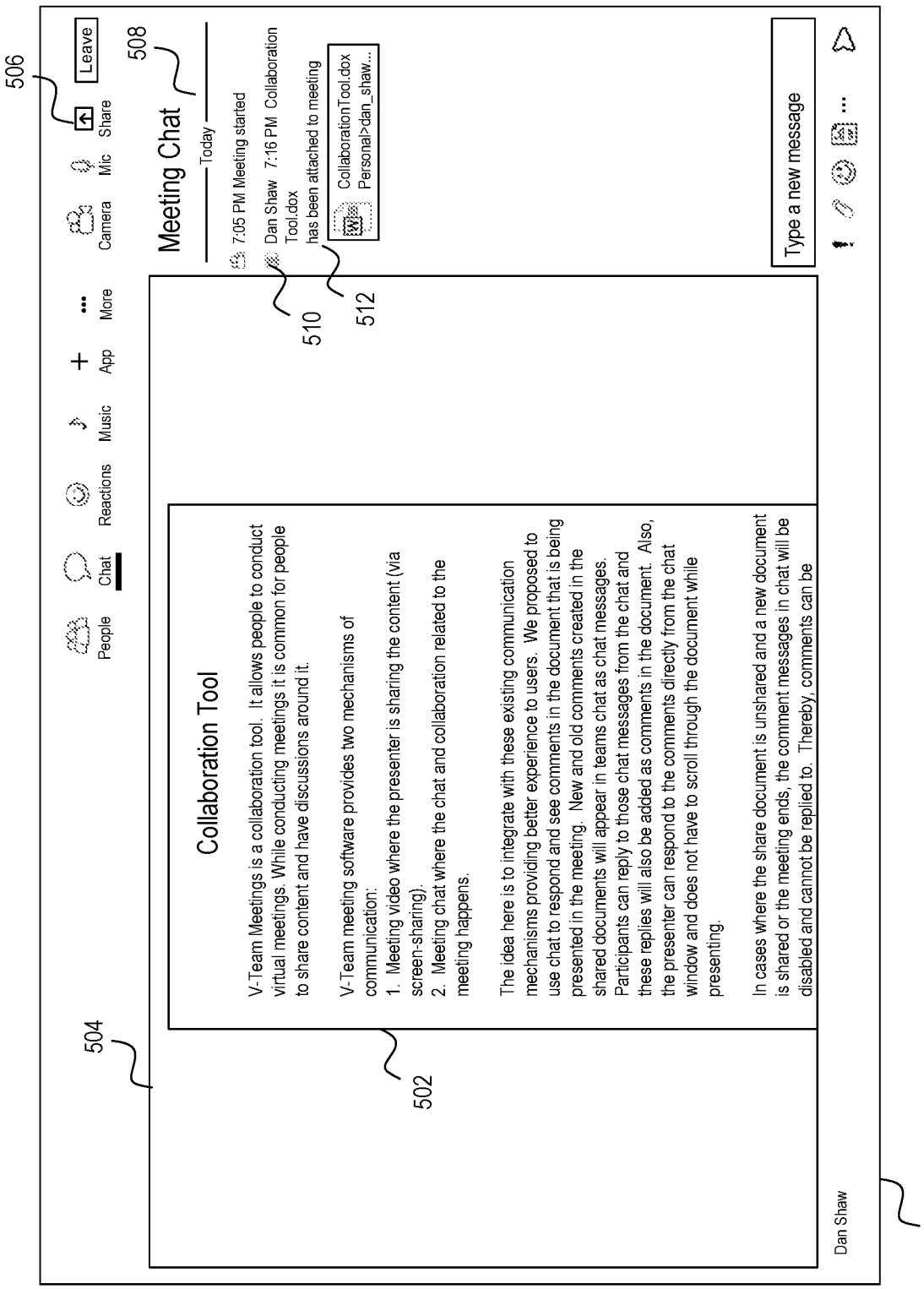
FIG. 5A-FIG. 5E are screenshots of a virtual meeting user interface illustrating example commenting operations during the virtual meeting, according to some example embodiments.

FIG. 5A-FIG. 5E are screenshots of a virtual meeting user interface 500 illustrating example commenting operations during the virtual meeting, according to some example embodiments. Referring to FIG. 5A, the meeting user interface 500 shows a document 502 being shared in a screen-share section 504 of the meeting user interface 500. In example embodiments, a user that wants to share the document 502 may activate an application client or application system, open the document 502, and trigger sharing of the document 502 by selecting a share screen icon 506 on the meeting user interface 500. For example, the presenter (e.g., Stacy Jay) can open a word document on their client device 106 using the word processing client 112 and share their screen. The comment widget attaches to the document 502 and monitors for comments made to or about a portion of the document 502.

The meeting user interface 500 also includes a chat section 508 ("Meeting Chat") in which comments (e.g., document comments, replies to document comments, chat messages, meeting operations) can be shared. Each comment in the chat section 508 can be associated with a user identifier 510 of a user that caused (e.g., created) the comment. The user identifier 510 can include an image of a user and/or a username. Each comment can also be associated with a time when the comment was created. In the example of FIG. 5A, the chat section 508 shows a meeting operation comment 512 indicating that the document 502 (e.g., CollaborationTool.docx) has been attached to the meeting. In other words, the document 502 is being shared.

Figure 5B:
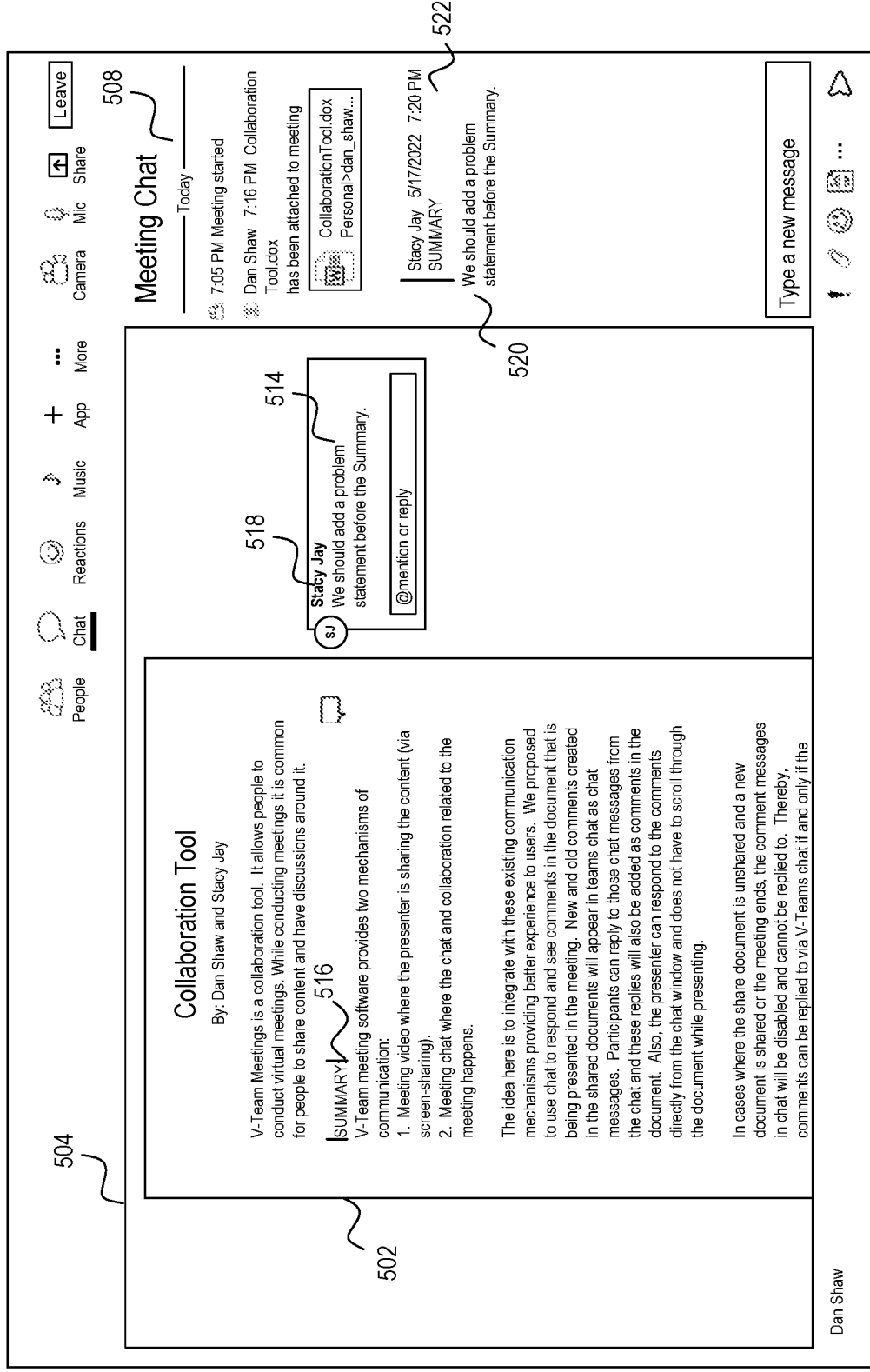

Referring now to FIG. 5B, a comment 514 is made to a portion 516 (e.g., Summary) of the document 502 and is shown adjacent to the document 502 in the screen-share section 504. The comment 514 includes a user identifier 518 of a first user (i.e., Stacy Jay) that provided the comment 514.

The comment widget detects the comment 514 and synchronizes the comment 514 with the chat section 508. As such, the comment widget automatically posts a copy of the comment 514 to the chat section 508 (shown as comment 520) with a link to the portion 516 of the document 502 to which the comment is directed. The comment 520 in the chat section 508 includes the user identifier 518 and a corresponding time the comment 514 was made to the document 502. The comment 520 is a first comment associated with the portion of the document (Summary 516). As such, the comment 520 is a first message in a comment thread 522 that is created in the chat section 508 associated with the portion 516 of the document. The comment thread can include a title or thread identifier (e.g., Summary).

Figure 5C:
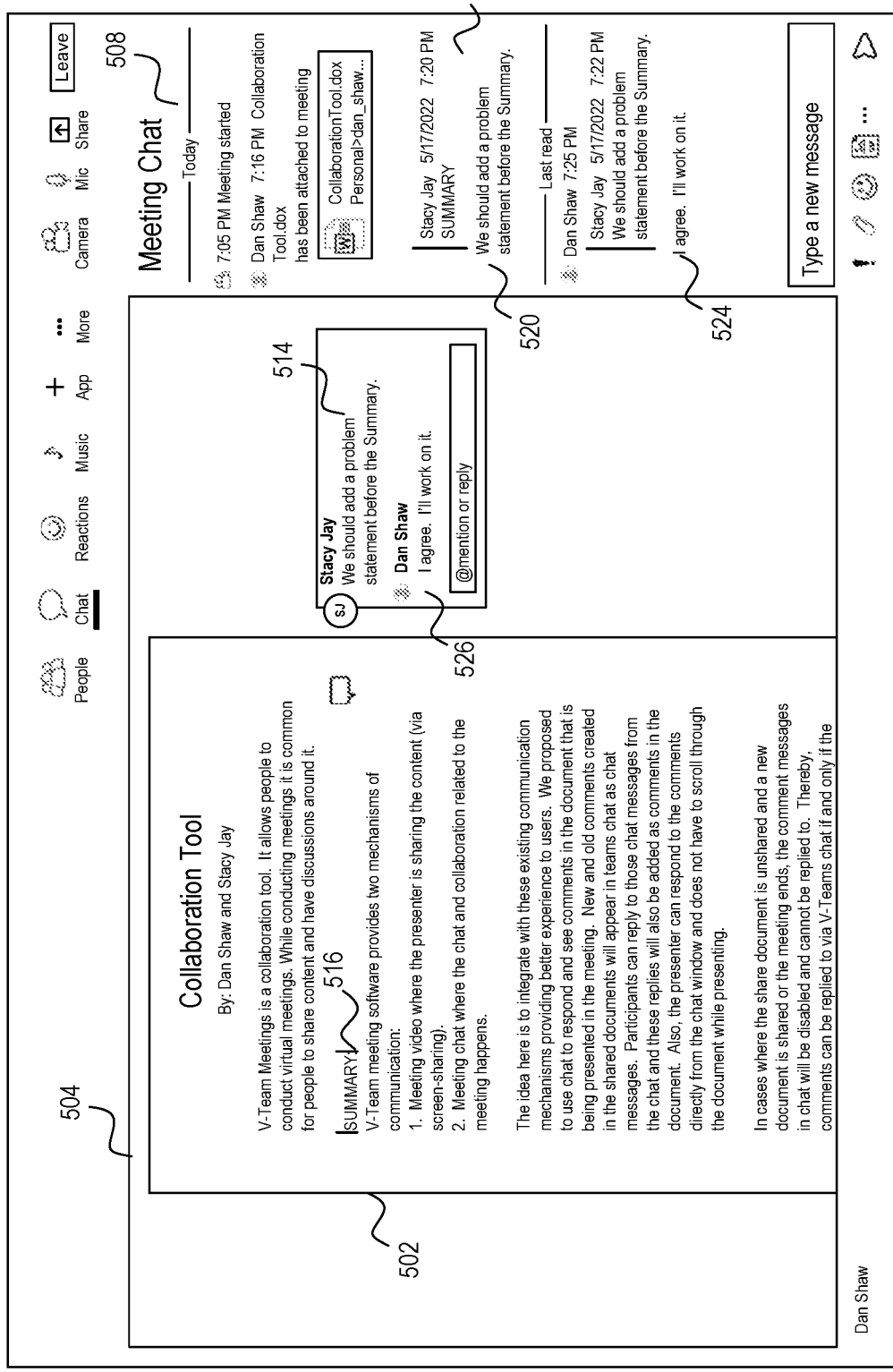

Referring now to FIG. 5C, a second user (i.e., Dan Shaw) has provided a reply 524 to the comment 514/520 from the first user in the chat section 508. The reply 524 is made to the (Summary) comment thread 522 and is thus a second comment in the comment thread 522. The comment widget identifies the link to the portion 516 and the comment 514 in the document 502 that the reply 524 corresponds to based on, for example, the comment thread 522. The comment widget then synchronizes the reply 524 to the document 502 by positioning a copy of the reply 524 (shown as comment 526) relative to the portion 516 of the document 502 and the comment 514 in a same context as the comment 514. Because the document 502 is being shared, this synchronization is shown in the screen-share section 504.

In the example shown in FIG. 5C, the comment thread 522 is shown with comment 520 being reproduced prior to the reply 524 on the chat section 508. In an alternative embodiment, the reply 524 can be shown directly below the comment 520 without reproducing the comment 520.

Figure 5D:
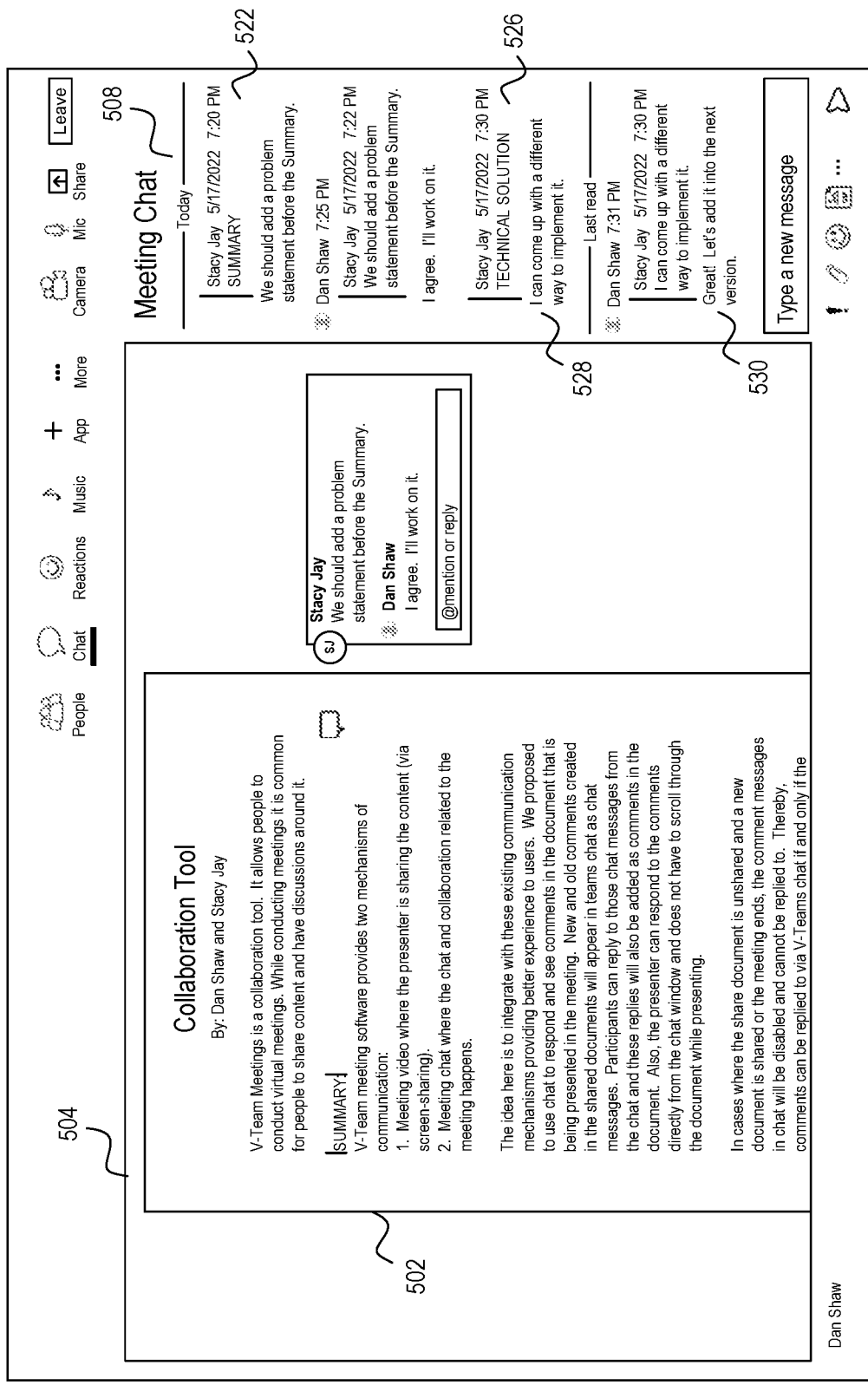

Referring now to FIG. 5D, a second thread 526 is present in the chat section 508. The second thread 526 is visually distinguished from the (first) comment thread 522 (e.g., by distance, by a title "Technical Solution"). Accordingly, at some point, Stacy Jay navigated to a second portion of the document 502 (e.g., associated with a "Technical Solution" part of the document 502) and added a third comment (not shown) at the second portion. The third comment is synchronized to the chat section 508 whereby the second comment thread 526 is created and a copy of the third comment 528 is displayed. In some embodiments, an initial comment in a comment thread can only be made directly to a particular portion of the document 502 to which it pertains in order to start a comment thread.

Later, the user sharing the document 502 navigates back to the beginning of the document 502. Even though the second portion of the document 502 is no longer visible in the screen-share section 504, any attendee can still reply to the second comment thread 526 without having to scroll the document 502 back to the comment being replied to in the second comment thread 526. For example, Dan Shaw can provide a reply 530 to the comment 528 in the second comment thread 526 while a different portion of the document 502 is visible in the screen-share section 504.

Figure 5E:
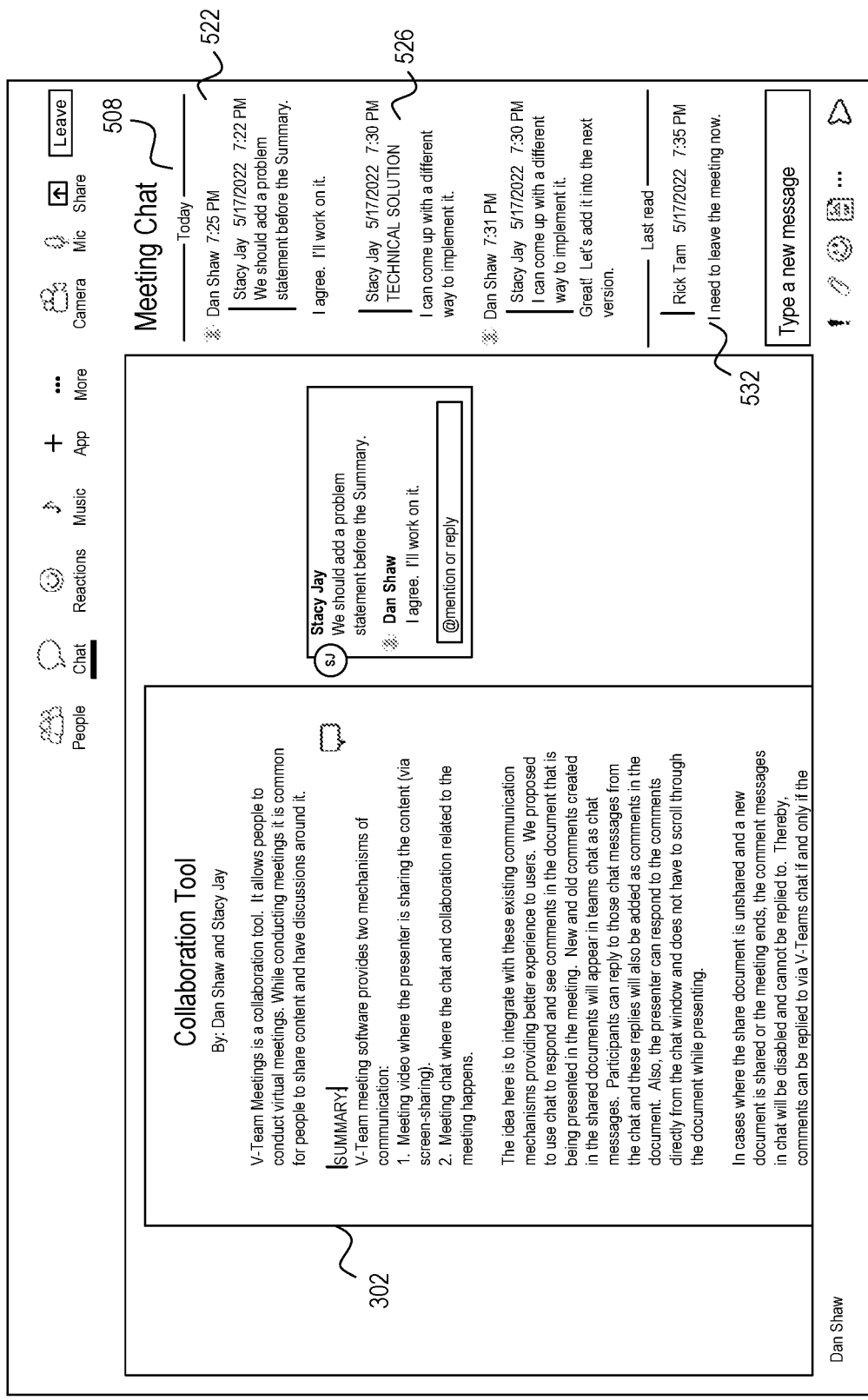

Referring now to FIG. 5E, a comment 532 that is not associated with any comment thread is shown. Specifically, the comment 532 is visually distinguished by a physical separation from the first comment thread 522 and the second comment thread 526. Here, Rick Tam indicates that he needs to leave the meeting. The comment widget detects this comment and determines that it is not a part of a comment thread. Thus, the comment widget determines that the comment 532 is likely a chat message that does not need to be synchronized with the document 502.

Figure 6:
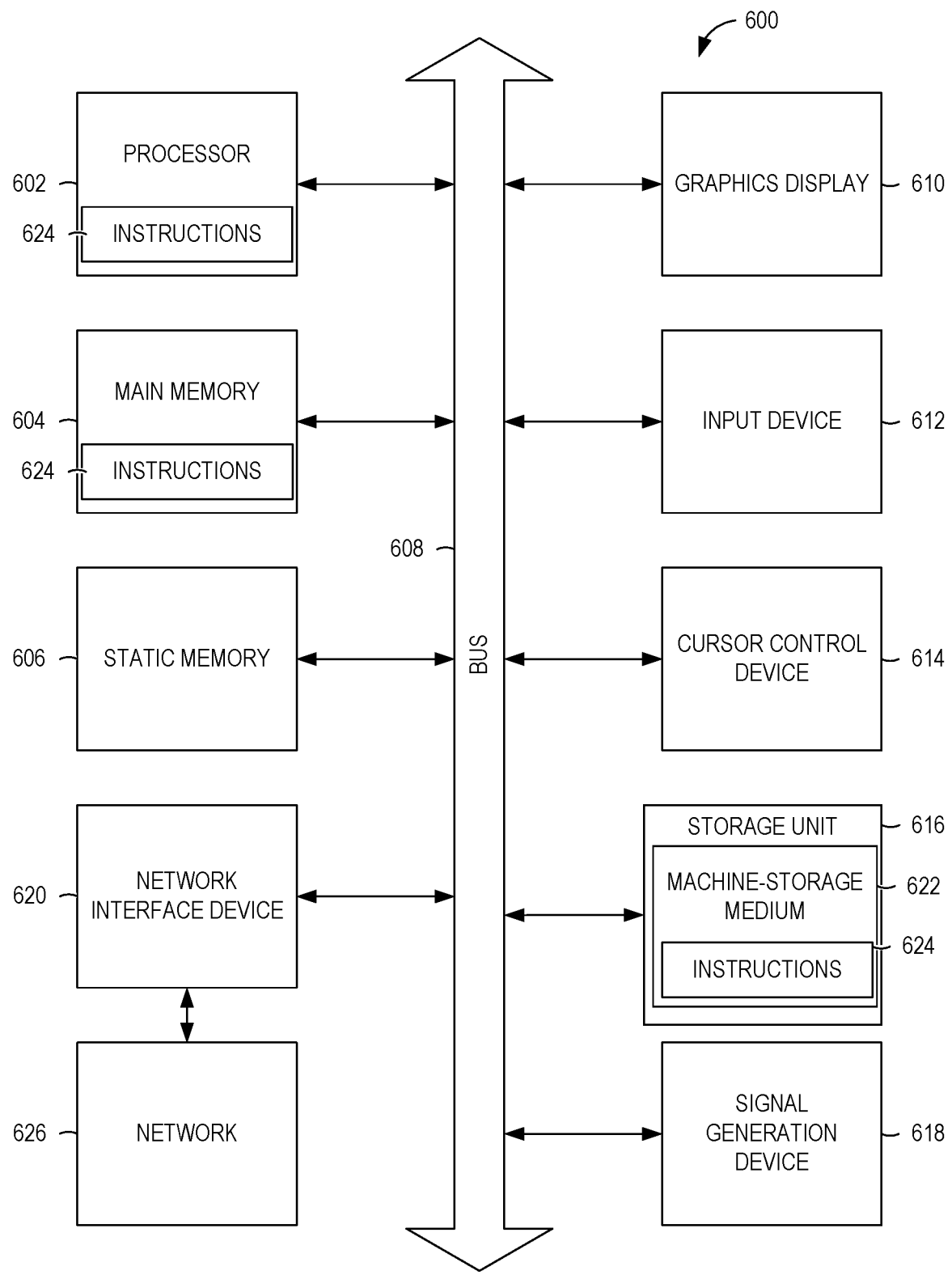
FIG. 6 is a block diagram illustrating components of a machine, according to some example embodiments, able to read instructions from a machine-storage medium and perform any one or more of the methodologies discussed herein.

FIG. 6 illustrates components of a machine 600, according to some example embodiments, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 6 shows a diagrammatic representation of the machine 600 in the example form of a computer device (e.g., a computer) and within which instructions 624 (e.g., software, a program, an application, an applet, an app, or other executable code) for causing the machine 600 to perform any one or more of the methodologies discussed herein may be executed, in whole or in part.

For example, the instructions 624 may cause the machine 600 to execute the flow diagram of FIG. 3 and FIG. 4. In one embodiment, the instructions 624 can transform the general, non-programmed machine 600 into a particular machine (e.g., specially configured machine) programmed to carry out the described and illustrated functions in the manner described.

In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624 (sequentially or otherwise) that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The processor 602 may contain microcircuits that are configurable, temporarily or permanently, by some or all of the instructions 624 such that the processor 602 is configurable to perform any one or more of the methodologies described herein, in whole or in part. For example, a set of one or more microcircuits of the processor 602 may be configurable to execute one or more modules (e.g., software modules) described herein.

The machine 600 may further include a graphics display 610 (e.g., a plasma display panel (PDP), a light emitting diode (LED) display, a liquid crystal display (LCD), a projector, or a cathode ray tube (CRT), or any other display capable of displaying graphics or video). The machine 600 may also include an input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a sound card, an amplifier, a speaker, a headphone jack, or any suitable combination thereof), and a network interface device 620.

The storage unit 616 includes a machine-storage medium 622 (e.g., a tangible machine-storage medium) on which is stored the instructions 624 (e.g., software) embodying any one or more of the methodologies or functions described herein. The instructions 624 may also reside, completely or at least partially, within the main memory 604, within the processor 602 (e.g., within the processor's cache memory), or both, before or during execution thereof by the machine 600. Accordingly, the main memory 604 and the processor 602 may be considered as machine-storage media (e.g., tangible and non-transitory machine-storage media). The instructions 624 may be transmitted or received over a network 626 via the network interface device 620.

In some example embodiments, the machine 600 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 604, 606, and/or memory of the processor(s) 602) and/or storage unit 616 may store one or more sets of instructions and data structures (e.g., software) 624 embodying or utilized by any one or more of the methodologies or functions described herein. These instructions, when executed by processor(s) 602 cause various operations to implement the disclosed embodiments.

As used herein, the terms "machine-storage medium," "device-storage medium," "computer-storage medium" (referred to collectively as "machine-storage medium 622") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 622 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium or media, computer-storage medium or media, and device-storage medium or media 622 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 624 may further be transmitted or received over a communications network 626 using a transmission medium via the network interface device 620 and utilizing any one of a number of well-known transfer protocols (e.g., HTTP). Examples of communication networks 626 include a local area network (LAN), a wide area network (WAN), the Internet, mobile telephone networks, plain old telephone service (POTS) networks, and wireless data networks (e.g., Wi-Fi, LTE, and WiMAX networks). The term "transmission medium" shall be taken to include any intangible medium that is capable of storing, encoding, or carrying instructions 624 for execution by the machine 600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a method for synchronizing comments between a document and a virtual meeting. The method comprises sharing a document during a virtual meeting, the sharing comprising causing presentation of the document in a screen-share section of a meeting user interface; monitoring for comments made to the document; in response to detecting a first comment made to the document, synchronizing the first comment with a chat section of the meeting user interface by automatically posting a copy of the first comment to the chat section, the first comment in the document section linked to a first portion of the document to which the comment is directed; monitoring for comments made in the chat section of the meeting user interface, the monitoring includes detecting that a second comment made in the chat section is linked to the first comment; and in response to detecting the second comment is linked to the first comment, synchronizing the second comment to the document by positioning a copy of the second comment relative to the first portion of the document and the first comment in a same context, the first comment and the second comment creating a first comment thread in the chat section.

In example 2, the subject matter of example 1 can optionally include wherein the chat section includes one or more chat messages not related to the first comment thread, the one or more chat messages being visually distinguished from the first comment thread.

In example 3, the subject matter of any of examples 1-2 can optionally include wherein the chat section includes a plurality of comment threads including the first comment thread and a second comment thread linked to a second portion of the document.

In example 4, the subject matter of any of examples 1-3 can optionally include mapping a reply to one of the plurality of comment threads to a correct portion of the document by identifying a link to the correct portion of the document and a corresponding comment in the document based on a corresponding comment thread.

In example 5, the subject matter of any of examples 1-4 can optionally include wherein receiving the second comment occurs when the first portion of the document is not viewable in the screen-share section.

In example 6, the subject matter of any of examples 1-5 can optionally include automatically saving the document with the comments including the first comment and the second comment during the virtual meeting.

In example 7, the subject matter of any of examples 1-6 can optionally include attaching a comment widget to the document upon the document being shared in the screen-share section during the virtual meeting, the comment widget performing the monitoring and the synchronizing between the document and the chat section.

In example 8, the subject matter of any of examples 1-7 can optionally include detaching the comment widget from the document upon the unsharing of the document during the virtual meeting or the virtual meeting ending.

In example 9, the subject matter of any of examples 1-8 can optionally include wherein the first comment on the document includes a user identifier of a first user that posted the first comment; and the synchronizing the second comment to the document further comprises including a user identifier of a second user that posted the second comment.

In example 10, the subject matter of any of examples 1-9 can optionally include wherein the monitoring for comments made in the chat section of the meeting user interface further comprises detecting that a third comment made in the chat section is not related to any comment threads; and based on detecting that the third comment is not related, refraining from posting the third comment to the document.

Example 11 is a system for synchronizing comments between a document and a virtual meeting. The system comprises one or more hardware processors and a memory storing instructions that, when executed by the one or more hardware processors, cause the one or more hardware processors to perform operations comprising sharing a document during a virtual meeting, the sharing comprising causing presentation of the document in a screen-share section of a meeting user interface; monitoring for comments made to the document; in response to detecting a first comment made to the document, synchronizing the first comment with a chat section of the meeting user interface by automatically posting a copy of the first comment to the chat section, the first comment in the document section linked to a first portion of the document to which the comment is directed; monitoring for comments made in the chat section of the meeting user interface, the monitoring includes detecting that a second comment made in the chat section is linked to the first comment; and in response to detecting the second comment is linked to the first comment, synchronizing the second comment to the document by positioning a copy of the second comment relative to the first portion of the document and the first comment in a same context, the first comment and the second comment creating a first comment thread in the chat section.

In example 12, the subject matter of example 11 can optionally include wherein the chat section includes one or more chat messages not related to the first comment thread, the one or more chat messages being visually distinguished from the first comment thread.

In example 13, the subject matter of any of examples 11-12 can optionally include wherein the chat section includes a plurality of comment threads including the first comment thread and a second comment thread linked to a second portion of the document.

In example 14, the subject matter of any of examples 11-13 can optionally include wherein the operations further comprise mapping a reply to one of the plurality of comment threads to a correct portion of the document by identifying a link to the correct portion of the document and a corresponding comment in the document based on a corresponding comment thread.

In example 15, the subject matter of any of examples 11-14 can optionally include wherein receiving the second comment occurs when the first portion of the document is not viewable in the screen-share section.

In example 16, the subject matter of any of examples 11-15 can optionally include wherein the operations further comprise automatically saving the document with the comments including the first comment and the second comment during the virtual meeting.

In example 17, the subject matter of any of examples 15-16 can optionally include wherein the operations further comprise attaching a comment widget to the document upon the document being shared in the screen-share section during the virtual meeting, the comment widget performing the monitoring and the synchronizing between the document and the chat section.

In example 18, the subject matter of any of examples 15-17 can optionally include wherein the operations further comprise detaching the comment widget from the document upon the unsharing of the document during the virtual meeting or the virtual meeting ending.

In example 19, the subject matter of any of examples 15-18 can optionally include wherein the monitoring for comments made in the chat section of the meeting user interface further comprises detecting that a third comment made in the chat section is not related to any comment threads; and based on detecting that the third comment is not related, refraining from posting the third comment to the document.

Example 20 is a computer-storage medium comprising instructions which, when executed by one or more hardware processors of a machine, cause the machine to perform operations for synchronizing comments between a document and a virtual meeting. The operations comprise sharing a document during a virtual meeting, the sharing comprising causing presentation of the document in a screen-share section of a meeting user interface; monitoring for comments made to the document; in response to detecting a first comment made to the document, synchronizing the first comment with a chat section of the meeting user interface by automatically posting a copy of the first comment to the chat section, the first comment in the document section linked to a first portion of the document to which the comment is directed; monitoring for comments made in the chat section of the meeting user interface, the monitoring includes detecting that a second comment made in the chat section is linked to the first comment; and in response to detecting the second comment is linked to the first comment, synchronizing the second comment to the document by positioning a copy of the second comment relative to the first portion of the document and the first comment in a same context, the first comment and the second comment creating a first comment thread in the chat section.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within the scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
    sharing a document during a virtual meeting, the sharing comprising causing presentation of the document in a screen-share section of a meeting user interface;
    monitoring for a first comment made to the document in the screen-share section during the virtual meeting, the first comment being shown adjacent to the entire document visible in the screen-share section and visually linked to a first portion of the document to which the first comment is directed via a visual indicator at the first portion of the document;
    in response to detecting the first comment made to the document in the screen-share section, synchronizing the first comment with a chat section of the meeting user interface by automatically posting a copy of the first comment to the chat section during the virtual meeting;
    monitoring for comments made in the chat section of the meeting user interface, the monitoring includes detecting that a second comment made in the chat section is linked to the first comment; and
    in response to detecting the second comment is linked to the first comment, synchronizing the second comment to the document by positioning a copy of the second comment relative to the first portion of the document and the first comment in the screen-share section during the virtual meeting, the first comment and the second comment creating a first comment thread in the chat section.

2. The method of claim 1, wherein the chat section includes one or more chat messages not related to the first comment thread, the one or more chat messages being visually distinguished from the first comment thread.

3. The method of claim 1, wherein the chat section includes a plurality of comment threads including the first comment thread and a second comment thread linked to a second portion of the document.

4. The method of claim 3, further comprising mapping a reply to one of the plurality of comment threads to a correct portion of the document by identifying a link to the correct portion of the document and a corresponding comment in the document based on a corresponding comment thread.

5. The method of claim 1, wherein receiving the second comment in the chat section occurs when the first portion of the document is not viewable in the screen-share section.

6. The method of claim 1, further comprising:
automatically saving the document with the comments including the first comment and the second comment during the virtual meeting.

7. The method of claim 1, further comprising:
attaching a comment widget to the document upon the document being shared in the screen-share section during the virtual meeting, the comment widget performing the monitoring and the synchronizing between the document and the chat section.

8. The method of claim 7, further comprising:
detaching the comment widget from the document upon the unsharing of the document during the virtual meeting or the virtual meeting ending.

9. The method of claim 1, wherein:
the first comment on the document includes a user identifier of a first user that posted the first comment; and
the synchronizing the second comment to the document further comprises including a user identifier of a second user that posted the second comment.

10. The method of claim 1, wherein the monitoring for comments made in the chat section of the meeting user interface further comprises:
detecting that a third comment made in the chat section is not related to any comment threads; and
based on detecting that the third comment is not related, refraining from posting the third comment to the document.

11. A system comprising:
one or more hardware processors; and
a memory storing instructions that, when executed by the one or more hardware processors, cause the one or more hardware processors to perform operations comprising:
sharing a document during a virtual meeting, the sharing comprising causing presentation of the document in a screen-share section of a meeting user interface;
monitoring for a first comment made to the document in the screen-share section during the virtual meeting, the first comment being shown adjacent to the entire document visible in the screen-share section and visually linked to a first portion of the document to which the first comment is directed via a visual indicator at the first portion of the document;
in response to detecting the first comment made to the document in the screen-share section, synchronizing the first comment with a chat section of the meeting user interface by automatically posting a copy of the first comment to the chat section during the virtual meeting;
monitoring for comments made in the chat section of the meeting user interface, the monitoring includes detecting that a second comment made in the chat section is linked to the first comment; and
in response to detecting the second comment is linked to the first comment, synchronizing the second comment to the document by positioning a copy of the second comment relative to the first portion of the document and the first comment in the screen-share section during the virtual meeting, the first comment and the second comment creating a first comment thread in the chat section.

12. The system of claim 11, wherein the chat section includes one or more chat messages not related to the first comment thread, the one or more chat messages being visually distinguished from the first comment thread.

13. The system of claim 11, wherein the chat section includes a plurality of comment threads including the first comment thread and a second comment thread linked to a second portion of the document.

14. The system of claim 13, wherein the operations further comprise mapping a reply to one of the plurality of comment threads to a correct portion of the document by identifying a link to the correct portion of the document and a corresponding comment in the document based on a corresponding comment thread.

15. The system of claim 11, wherein receiving the second comment in the chat section occurs when the first portion of the document is not viewable in the screen-share section.

16. The system of claim 11, wherein the operations further comprise:
automatically saving the document with the comments including the first comment and the second comment during the virtual meeting.

17. The system of claim 11, wherein the operations further comprise:
attaching a comment widget to the document upon the document being shared in the screen-share section during the virtual meeting, the comment widget performing the monitoring and the synchronizing between the document and the chat section.

18. The system of claim 17, wherein the operations further comprise:
detaching the comment widget from the document upon the unsharing of the document during the virtual meeting or the virtual meeting ending.

19. The system of claim 11, wherein the monitoring for comments made in the chat section of the meeting user interface further comprises:
detecting that a third comment made in the chat section is not related to any comment threads; and
based on detecting that the third comment is not related, refraining from posting the third comment to the document.

20. A storage-medium storing instructions which, when executed by one or more hardware processors of a machine, cause the machine to perform operations comprising:
sharing a document during a virtual meeting, the sharing comprising causing presentation of the document in a screen-share section of a meeting user interface;
monitoring for a first comment made to the document in the screen-share section during the virtual meeting, the first comment being shown adjacent to the document in the screen-share section and visually linked to a first portion of the document to which the first comment is directed via a visual indicator at the first portion of the document;
in response to detecting the first comment made to the document in the screen-share section, synchronizing the first comment with a chat section of the meeting user interface by automatically posting a copy of the first comment to the chat section during the virtual meeting;
monitoring for comments made in the chat section of the meeting user interface, the monitoring includes detecting that a second comment made in the chat section is linked to the first comment; and
in response to detecting the second comment is linked to the first comment, synchronizing the second comment to the document by positioning a copy of the second comment relative to the first portion of the document and the first comment in the screen-share section during the virtual meeting, the first comment and the second comment creating a first comment thread in the chat section.

\* \* \* \* \*